(12) United States Patent
Landis

(10) Patent No.: US 7,678,287 B2
(45) Date of Patent: Mar. 16, 2010

(54) INFORMATION STORAGE MEDIUM AND METHOD FOR PRODUCING A STORAGE MEDIUM OF THIS TYPE

(75) Inventor: Stefan Landis, Voiron (FR)

(73) Assignee: Commissariat a l'Energie Atomique, Paris (FR)

( * ) Notice: Subject to any disclaimer, the term of this patent is extended or adjusted under 35 U.S.C. 154(b) by 875 days.

(21) Appl. No.: 10/573,156

(22) PCT Filed: Oct. 1, 2004

(86) PCT No.: PCT/FR2004/050477

§ 371 (c)(1),
(2), (4) Date: Mar. 23, 2006

(87) PCT Pub. No.: WO2005/034098

PCT Pub. Date: Apr. 14, 2005

(65) Prior Publication Data

US 2006/0280971 A1    Dec. 14, 2006

(30) Foreign Application Priority Data

Oct. 3, 2003    (FR)    ................... 03 50650

(51) Int. Cl.
B44C 1/22    (2006.01)
G11B 5/84    (2006.01)
(52) U.S. Cl. ............... 216/22; 216/33; 216/40
(58) Field of Classification Search .......... 216/22
See application file for complete search history.

(56) References Cited

U.S. PATENT DOCUMENTS

| 6,602,620 | B1 | 8/2003 | Kikitsu et al. | |
|---|---|---|---|---|
| 7,090,933 | B2 * | 8/2006 | Yamakage et al. | 428/820 |
| 7,138,193 | B2 * | 11/2006 | Rodmacq et al. | 428/826 |
| 7,147,790 | B2 * | 12/2006 | Wachenschwanz et al. | 216/22 |
| 7,306,743 | B2 * | 12/2007 | Hieda et al. | 216/22 |
| 7,378,028 | B2 * | 5/2008 | Wago et al. | 216/22 |
| 2002/0022147 | A1 | 2/2002 | Takeshita et al. | |
| 2004/0057149 | A1 * | 3/2004 | Yoshizawa et al. | 360/69 |
| 2004/0080871 | A1 * | 4/2004 | Usa et al. | 360/135 |
| 2006/0144812 | A1 * | 7/2006 | Imada et al. | 216/22 |

FOREIGN PATENT DOCUMENTS

WO    03/005349    1/2003

OTHER PUBLICATIONS

Chou, Stephen Y. et al., "Nanolithographically defined magnetic structures and quantum magnetic disk (invited)", J. Appl. Phys. vol. 79, No. 8, pp. 6101-6106, Apr. 15, 1996.
Landis, S. et al., "Domain structure of magnetic layers deposited on patterned silicon", Applied Physics Letters, vol. 75, No. 16, pp. 2473-2475, Oct. 18, 1999.

(Continued)

Primary Examiner—Anita K Alanko
(74) Attorney, Agent, or Firm—Oblon, Spivak, McClelland, Maier & Neustadt, L.L.P.

(57) ABSTRACT

An information storage medium and method of manufacturing such a medium, particularly applicable to computer hard disks. An information storage medium includes an approximately plane front face and a back face, the medium being read and/or written by a device placed facing the front face. The back face includes recessed areas and all or part of sidewalls and/or the bottom of the recessed areas is covered with a magnetic deposit, the distance separating the front face from the deposit being such that the device can read and/or write information in the deposit.

9 Claims, 6 Drawing Sheets

OTHER PUBLICATIONS

Krauss, Peter R. et al., "Fabrication of planar quantum magnetic disk structure using electron beam lithography, reactive ion etching, and chemical mechanical polishing", J. Vac. Sci. Technol. B, vol. 13, No. 6, pp. 2850-2852, 1995.

Chappert, C. et al., "Planar Patterned Magnetic Media Obtained by ion Irradiation", Science, vol. 280, pp. 1919-1922, Jun. 19, 1998.

* cited by examiner

INFORMATION STORAGE MEDIUM AND METHOD FOR PRODUCING A STORAGE MEDIUM OF THIS TYPE

TECHNICAL DOMAIN

This invention relates to an information storage medium and a method of manufacturing such a medium.

It is particularly applicable to hard disks for computers and memories for portable digital equipment.

STATE OF PRIOR ART

Information storage memories and particularly computer hard disks are currently composed of thin continuous layers of ferromagnetic grains. The direction of magnetisation of these grains is in the plane of the layers and each elementary bit, more simply called a "bit" is composed of several grains for which all magnetisations are approximately parallel.

Depending on the average magnetisation direction of each elementary bit, the read/write head flies above a thin layer of ferromagnetic grains and encodes information by creating a local magnetic field that can orient the magnetisation of each elementary bit in one direction or another.

The density of information stored on such media, is limited by the size of the elementary bits and by transition areas. Various solutions have been envisaged to increase this density:

the use of continuous magnetic materials with magnetisation perpendicular to the plane of the layer, and the use of discrete media, in other words arrays of magnetic dots, each dot corresponding to an elementary bit.

Further information on this subject is given in the following document:

[1] S. Y. Chou, P. R. Krauss and L. Kong, "Nanolithographically defined magnetic structures and quantum magnetic disk", Journal of Applied Physics 79, 6101 (1996).

The following techniques are known and have already been used for the manufacture of magnetic memories:

(1) manufacturing from an array of sub-micronic dots, for example made of silicon, aluminium, resin or glass on which a magnetic material is deposited, (2) manufacturing by etching a thin magnetic layer through a resins mask defining magnetic dots, and (3) manufacturing by local modification of the physical properties of a thin magnetic layer.

Techniques (1) to (3) are described in more detail in the following documents [2] to [4] respectively:

[2] S. Landis, B. Rodmacq and B. Dieny, "Domain structure of magnetic layers deposited on patterned silicon", Applied Physics Letters, 75, 2473 (1999).

[3] P. R. Krauss and S. Y. Chou "Fabrication of planar quantum magnetic disk structure using electron beam lithography, reactive ion etching, and chemical mechanical polishing", J. Vac Sci. Technol. B, 13, 2850 (1995).

[4] C. Chappert, H. Bernas, J. Ferré, V. Klotter, J. P. Jamet, Y. Chen, E. Cambril, T. Devolder, F. Rousseaux, V. Mathet and H. Launois, "Domain structure of magnetic layers deposited on patterned silicon", Science, 280, 1919 (1998).

Unlike technique (3), techniques (1) and (2) imply the presence of a topography on the surface of a sample with which they are used.

This is diagrammatically illustrated by:

FIG. 1 in which a substrate 2 can be seen on which a topography 4 is created (comprising dots 6 covered by magnetic layers 8), according to technique (1) or (2), and FIG. 2, which shows a substrate 3 on which a set of magnetic areas 12 are created, separated by non-magnetic areas 14 according to technique (3).

Furthermore, techniques (1) and (2) use methods that are more or less standard in the microelectronics field; for example a method of this type includes an optical or electronic or ionic lithography step, and lift off, etching and deposit.

For technique (3), a recording medium is obtained by forming a mask directly or indirectly on the surface of a sample and irradiating this sample with an ion beam through the mask. The areas that are not protected are then exposed to this beam.

Up to now, only the Pt/Co/Pt three-layer system could be used to demonstrate the reliability of such a method (see document [4]), while technique (1) can be used with any type of material.

Furthermore, up to now, no one has been capable of solving all the problems related to the flight of a read/write head above a non-plane surface to read/write information, and particularly hydrodynamic problems and synchronisation problems to assure that the head flies correctly above the dots formed on the surface.

All this is critical for the development of discrete magnetic memories.

PRESENTATION OF THE INVENTION

This invention discloses an information storage medium and a method of manufacturing this medium, that have the advantages of techniques (1) and (3) mentioned above.

Thus, like technique (3), the invention can be used to obtain a plane surface (corresponding to the standard configuration for read/write heads).

And like technique (1), the invention can be used to:

manufacture an information storage medium independently of the choice of the magnetic material, dissociate the substrate manufacturing step from the magnetic material deposition step, while obtaining discrete recording media, and keep the entire technology used at the moment for the flight of the read/write head above an information storage medium and for detection of elementary bits.

Specifically, the purpose of this invention is an information storage medium, this medium comprising an approximately plane front face and a back face, this medium being designed to be read and/or written by a read and/or write device placed facing the front face, this medium being characterised in that the back face comprises recessed areas and in that all or part of the sidewalls and/or the bottom of these recessed areas is covered with a magnetic deposit that will be used for information storage, the distance separating the front face from the magnetic deposit being such that the read and/or write device can read and/or write the information in the magnetic deposit.

According to one particular embodiment of the medium according to the invention, the back face of this medium is fixed to a substrate.

The invention also relates to a method for manufacturing an information storage medium according to the invention, in which the medium is formed comprising the approximately plane front face, the back face and a discrete information storage array on this back face, in the form of recessed areas advantageously with dimensions smaller than a micron provided with a magnetic deposit, each recessed area being capable of containing at least one magnetic domain representing an elementary bit defined by a magnetisation direction.

The recessed areas on the back face may have an arbitrary shape. Advantageously, cylindrically shaped recessed areas will be chosen, but the shape of these areas could also be conical, parallelepiped or other.

The back face may also comprise areas capable of making the medium stiff.

According to a first particular embodiment of the method according to the invention, the magnetic deposit is formed in the bottom of the recessed areas using a beam of atoms of at least one magnetic material directed onto the back face of the medium, perpendicular to this back face.

According to a second particular embodiment, the magnetic deposit is formed on all or part of the sidewalls of the recessed areas using a beam of atoms of at least one magnetic material directed onto the back face of the medium, oblique to this face.

According to one particular embodiment of the invention, the medium includes a substrate and the recessed areas are formed directly in this substrate.

According to another particular embodiment, the medium comprises a first layer, a second layer is formed on this first layer and recessed areas are formed through this second layer such that the bottom of these recessed areas is formed by the first layer.

The recessed areas may be formed by etching through an etching mask previously formed on the back face, the magnetic deposit may then be formed and the etching mask may be eliminated including the magnetic deposit located on it due to the formation of the magnetic deposit.

The back face of the medium may be fixed to an auxiliary substrate, this medium being provided with recessed areas comprising the magnetic deposit.

According to one particular embodiment of the method according to the invention, a first layer is formed on a substrate, a second layer is formed on this first layer and a third layer is formed on the second layer, the recessed areas are formed through the third layer such that the bottom of the recessed areas is formed by the second layer, the magnetic deposit is formed in the recessed areas, the second layer is separated from the substrate, and the recessed areas are closed off by a fourth layer.

BRIEF DESCRIPTION OF THE DRAWINGS

This invention will be better understood after reading the description of example embodiments given below, for information only and in no way limitative, with reference to the attached drawings in which.

DETAILED PRESENTATION OF PARTICULAR EMBODIMENTS

This invention is used to make a discrete medium with a plane surface, by discretising the magnetic surface through the back face of a substrate and depositing one or more magnetic materials on this back face.

Figure 1:
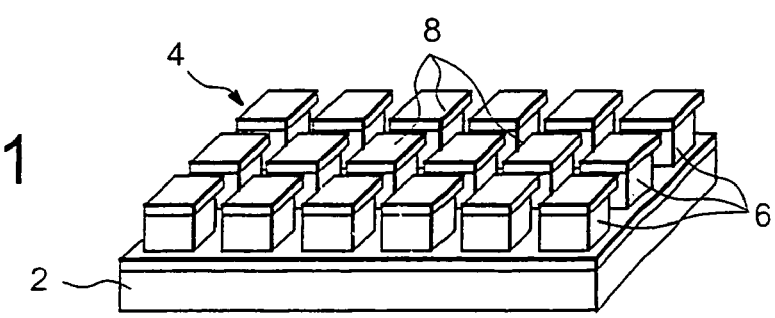
FIG. 1 diagrammatically illustrates known techniques (1) and (2) mentioned above, and has already been described, FIG. 2 diagrammatically illustrates the known technique (3) mentioned above, and has already been described.
Figure 2:
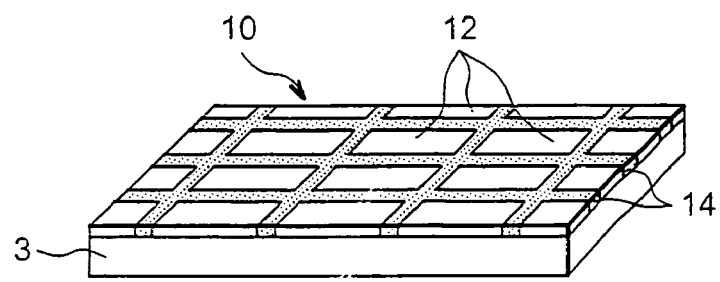
Figure 3:
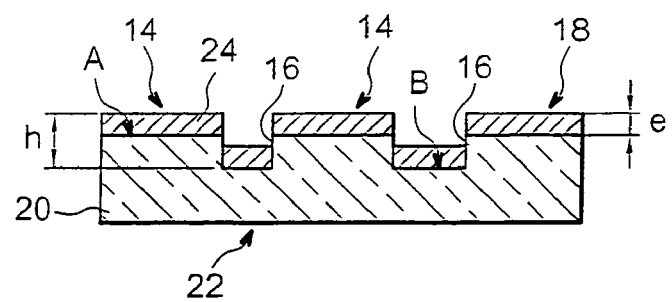
FIG. 3 is a diagrammatic and partial sectional view of a known information storage medium.
Figure 4:
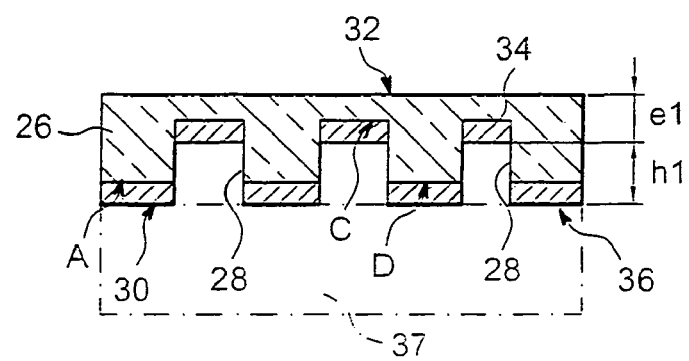
FIG. 4 is a diagrammatic and partial sectional view of a particular embodiment of the storage medium according to the invention.
Figure 5:
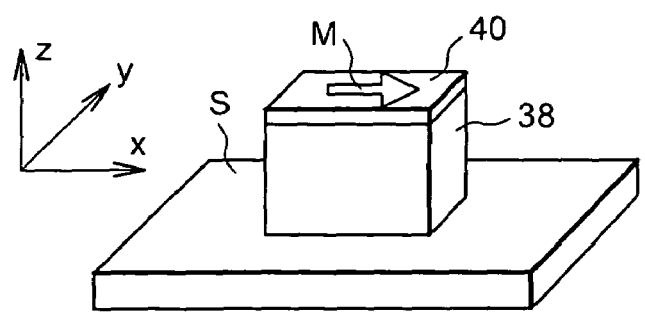
FIG. 5 is a diagrammatic view of a dot of a known information storage medium, this dot being magnetised parallel to the front face of this medium.

This is diagrammatically illustrated in FIGS. 3 and 4 that compare the topography resulting from the structuring of a substrate by a method according to the invention (FIG. 4) with the topography resulting from a conventional structure of a substrate (FIG. 3).

Dots 14 separated by trenches 16 are formed on the front face 18 of the structured substrate 20 in FIG. 3, for which the back face 22 is approximately plane. A magnetic material 24 is deposited in regions A and B that form the summit of the dots and the bottom of the trenches respectively.

In the case of the structured substrate 26 in FIG. 4, recesses 28 are formed in the back face 30 of this substrate for which the front face 32 is approximately plane.

A magnetic material 34 is deposited in regions C and D that form the bottom of the recesses and the top of the walls 36 separating these recesses, respectively.

In the case shown in FIG. 3, the height h of the trenches is chosen such that only region A is sufficiently close to the read/write head to be useable for information storage, region B then being sufficiently far to disturb neither the read nor the write and to not disturb the region A. Remember that the read/write head (not shown) is in place above the front face 18.

The height h can advantageously be chosen such that it is greater than the thickness e of the deposited magnetic material, so that there is no direct connection between these different regions.

Furthermore, it is possible to calculate the minimum height (minimum value $h_{min}$ of h) below which the magnetostatic interaction (interaction between magnetisation of an elementary bit and the magnetic field irradiated by the other areas of the medium covered by the magnetic material) is predominant compared with the anisotropy energy that determines the stability of the magnetisation direction.

A height h greater than this minimum height $h_{min}$ can then advantageously be chosen to improve stability.

Note that a similar reasoning can be applied to determine the parameter h1 in FIG. 4 (see below).

In the case in FIG. 4, h1 represents the height of the recesses, and this height h1 is also chosen such that only regions C can be used for storage of information and that regions D do not disturb these regions C.

But in this case, the thickness e1 also has to be optimised, this thickness being the sum of the thickness of the deposited magnetic material and the distance between the bottom of the recesses and the front face 32 of the medium, such that the regions C are not too far from the read/write head (which is not shown and which is again placed above the front face of the medium), so that the magnetic signal that might be recorded in the material 34 deposited at the bottom of the recesses, remains detectable.

For example, e1 can advantageously be chosen to be less than h1.

Knowing the read/write device (or head) used and the maximum magnetic field that this device can generate at its surface, it is also possible to determine the intensity of the magnetic field radiated at the magnetic layer (or area) 34 in the region C.

The intensity of the radiated magnetic field decreases as $1/r^a$, in which the exponent a that depends on the geometry of the read/write device, is approximately equal to 3. Consequently, knowing the flight height of the read/write device and the value of the magnetic field that has to be obtained at the magnetic layer 34, the thickness e1 can be adjusted.

The mechanical stresses to be resisted by the medium in FIG. 4 must also be taken into account so that this thickness e1, that depends on the chemical nature and the mechanical properties of the material used to make this support is sufficient, to assure that there is no breakage of the medium at locations at which it is thinnest.

The back face 30 of the medium in FIG. 4 may be fixed to a substrate 37, for example by bonding, in order to reinforce this medium.

In order to give an order of magnitude of the signal as mentioned above, the intensity of the component Hz of the magnetic field radiated in the different cases can be compared with reference to FIGS. 5 to 10. Consider the case in which an elementary bit is a parallelepiped made of a magnetic material with size 200 nm×200 nm×10 nm, where 10 nm represents the thickness of the layer of magnetic material.

Figure 8:
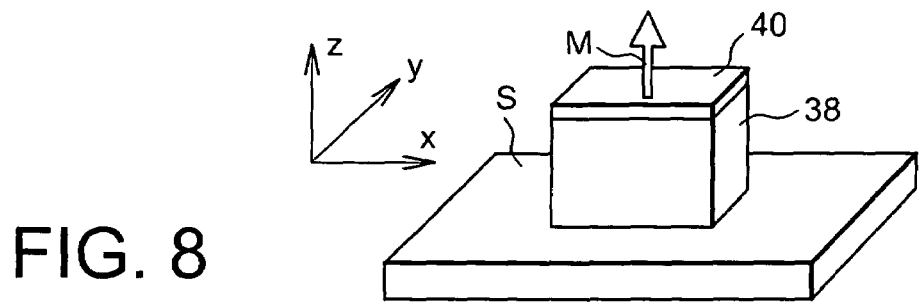
FIG. 8 is a diagrammatic view of a dot on a known information storage medium, this dot being magnetised perpendicular to the front face of this medium.
Figure 9:
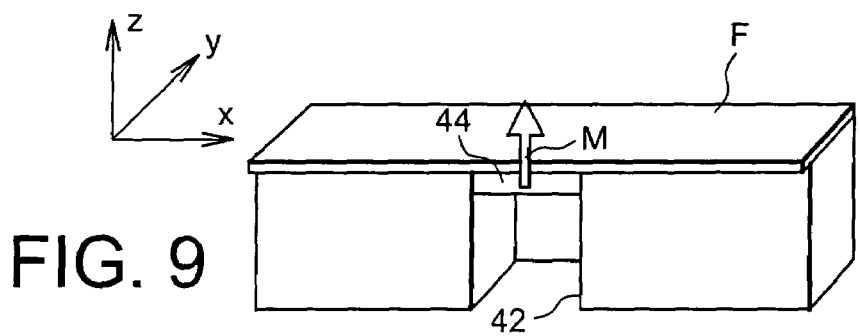
FIG. 9 is a diagrammatic view of a recessed area of an information storage medium according to the invention, this recessed area being magnetised perpendicular to the front face of this medium.

The intensity of the component Hz of a conventional dot system can be compared with the intensity of a medium according to the invention (FIGS. 8 and 9).

Note that Hz is measured along the z axis of the coordinate system (x, y, z) in which each of the axes x, y and z is perpendicular to the other two. In the case in FIGS. 5 and 8, the (x, y) plane is the plane of the surface S of the medium starting from which the dots are formed that are assumed to be parallelepiped shaped in the case shown in these FIGS. 5 and 8.

Figure 6:
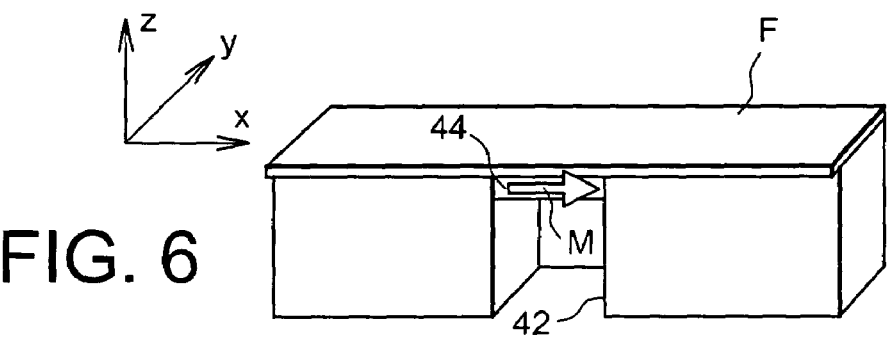
FIG. 6 is a diagrammatic view of a recessed area of an information storage medium according to the invention, this recessed area being magnetised parallel to the front face of this medium.

In the case of FIGS. 6 and 9, the (x, y) plane is the plane of the front face F of the medium below which the recesses are formed but are also assumed to be parallelepiped shaped in the case shown in these FIGS. 6 and 9.

Firstly, the intensity of the component Hz for a dot 3-8 covered with a magnetic layer 40 (FIG. 5) is compared with the intensity for a recess 42 for which the bottom is covered with a magnetic layer 44, the layers 40 and 44 having a magnetisation M perpendicular to the z direction.

For a conventional dot 38, in other words the dot that is in relief above the surface, the read head typically flies at a height of 20 nm above the surface of the medium.

Figure 7:
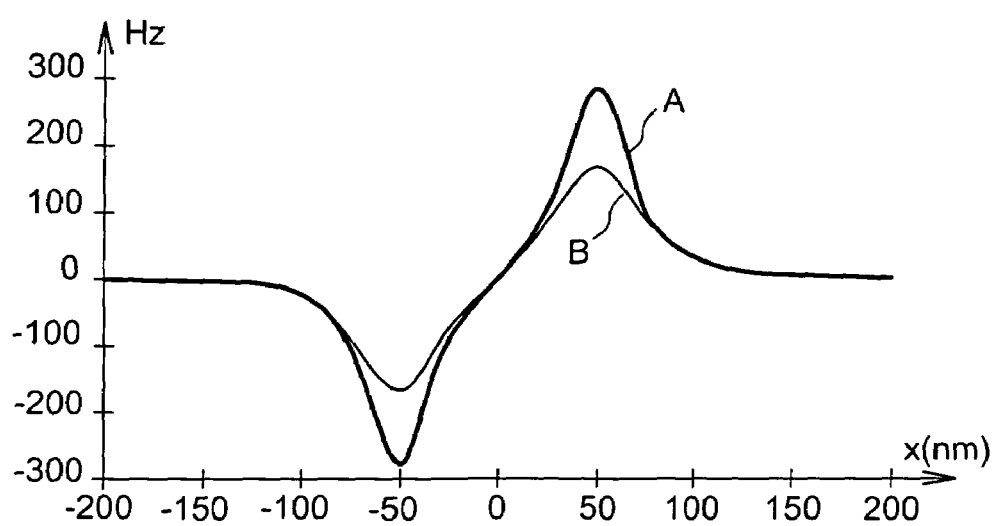
FIG. 7 shows variations of the magnetic field along a direction perpendicular to the front face of an information storage medium, in the case of a known medium (curve A) and in the case of a medium according to the invention (curve B)

Refer to FIG. 7 that shows variations of Hz (in arbitrary units) as a function of the distance x (in nm) to the centre of the dot (measured parallel to the x axis). The case of the conventional dot corresponds to curve A in FIG. 7.

If the array of "recessed dots" 42 is made using this invention with a thickness e1 (FIG. 4) of the order of 10 nm, the head flies at a height of 30 nm above the surface of the magnetic material (corresponding to 10 nm for the substrate thickness plus 20 nm for the conventional flight height) and this case of the "recessed dot" according to the invention corresponds to curve B in FIG. 7.

Considering curves A and B in FIG. 7, note that the maximum value of Hz on curve B is only equal to half of the maximum value of Hz on curve A and remains equal to the same order of magnitude as the latter.

We will now consider the case in which the magnetisation M is perpendicular to the surface of the medium and is therefore parallel to the z direction. More precisely, M is perpendicular to the surface S in the case of the conventional dot (FIG. 8) and to the front face F in the case of the "recessed dot" formed according to the invention (FIG. 9).

Figure 10:
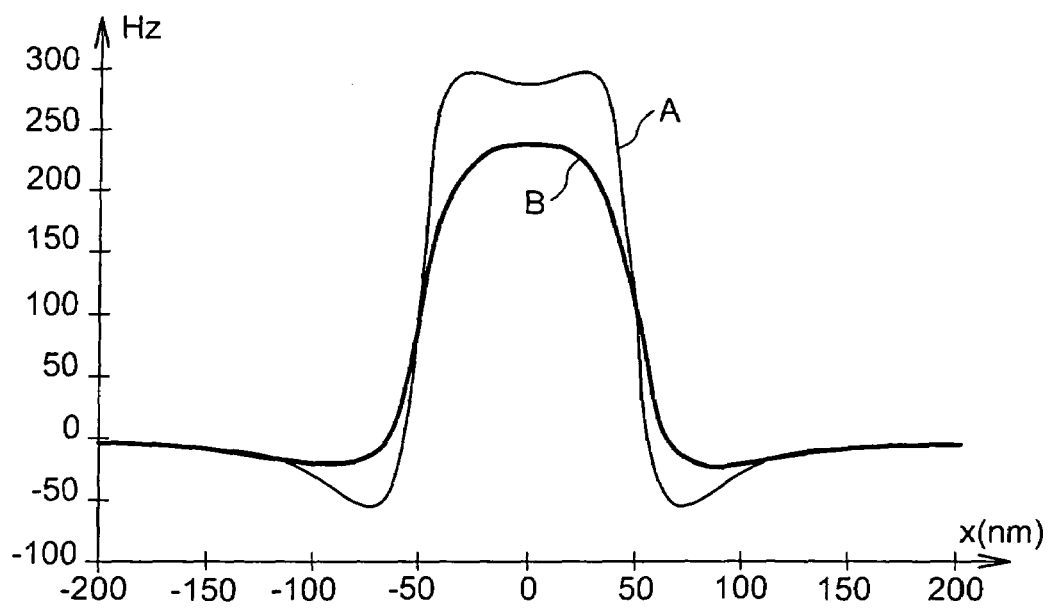
FIG. 10 shows variation of the magnetic field along a direction parallel to the front face of an information storage medium, in the case of a known medium (curve A) and in the case of a medium according to the invention (curve B), FIG. 11 diagrammatically illustrates the flight of a read/write head above the front face of a known information storage medium, FIG. 12 diagrammatically illustrates the flight of a read/write head above the front face of an information storage medium according to the invention.

We will now consider the same configuration, in other words curve A in FIG. 10 represents the signal perceived by the head at a distance of 20 nm above the surface of the conventional dot forming part of an array of dots in relief, and curve B in FIG. 10 corresponds to flight of the head at 20 nm above the front face of the medium made according to the invention (with a thickness e1 of 10 nm, namely an effective height of 30 nm above the magnetic surface).

Note that FIG. 10 also shows variations of Hz (in arbitrary units) as a function of the distance x (in nm) to the centre of the dot (measured parallel to the x axis).

FIG. 10 then shows that the signal reduction is less important in the case of a perpendicular magnetisation: the value changes from 280 to 230 in arbitrary units.

This configuration (perpendicular magnetisation) is better than the previous configuration for this invention.

Thus, the examples in FIGS. 6 and 9 show that the residual thickness of the substrate that separates the magnetic layer from the surface of the recording medium (thickness e1) only has a slight influence on the intensity of the radiated signal and therefore makes it possible to use this invention.

Figure 11:
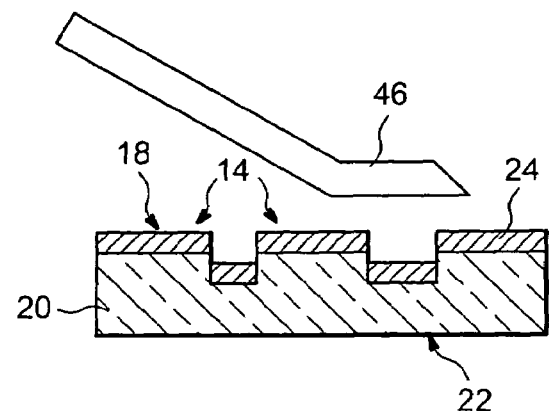

Concerning the flight of the read/write head 46 (FIGS. 11 and 12), the configuration used is that shown in FIG. 11 in the case of a conventional medium, of the type shown in FIG. 3; the head 46 flies above the upper surface 18 provided with magnetic dots in relief.

Figure 12:
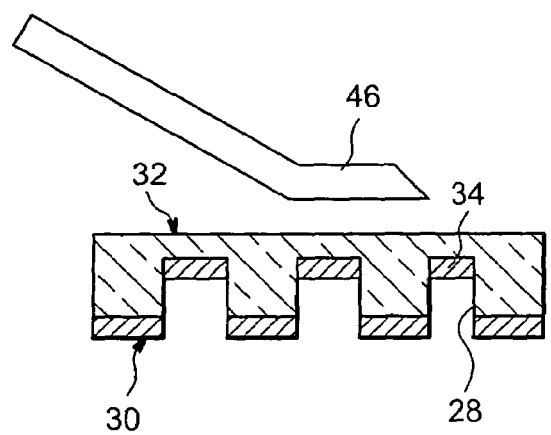

In the case of a support according to the invention of the type shown in FIG. 4, the configuration used is as shown in FIG. 12; the head 46 flies above the approximately plane front face 32, below which "recessed dots" are formed.

In the case of the configuration in FIG. 12, the conditions are then the same as in the case of continuous media that are currently used in the manufacturing of recording media. This solves different problems related to the topography of the substrate:

- the flight stability of the read/write head above a non-plane surface (regardless of whether this read/write head is a device similar to that currently used in hard disks or is a near field tip, or a matrix of dots, or a lens in the case of a magneto-optical recording),
- the possibility of eliminating the need for deposition of a protective layer on the surface of the medium to protect the magnetic film (layer that could increase the distance between the head and the medium and that would therefore reduce the detectable signal),
- the possibility of using the existing and well-controlled technology for treatment of the surface of the recording medium (for example such as the deposition of a lubricant or a protective layer), and
- the possibility of reducing the flight height of the head to be less than for the conventional case shown in FIG. 11, and therefore increasing the intensity of the signal detected for reading.

We will now give some examples of the method according to the invention.

An array of holes is formed, with dimensions between a few nanometers and a few micrometers and for which the section is arbitrary (for example square, circular or oval) in a face of a substrate that is called the "back face", the other approximately plane face of this substrate then forming the front face.

For example, the holes array can be formed by using lithography/etching techniques or nano-printing techniques or auto-organisation techniques.

The thickness E (FIG. 13) remaining between the bottom of the holes 48 or the recesses and the plane face 50 of the substrate 52 (in which the holes are formed) will be chosen such that it is as thin as possible, while maintaining a mechanical stiffness of the assembly obtained high enough so that this assembly does not break.

Figure 13:
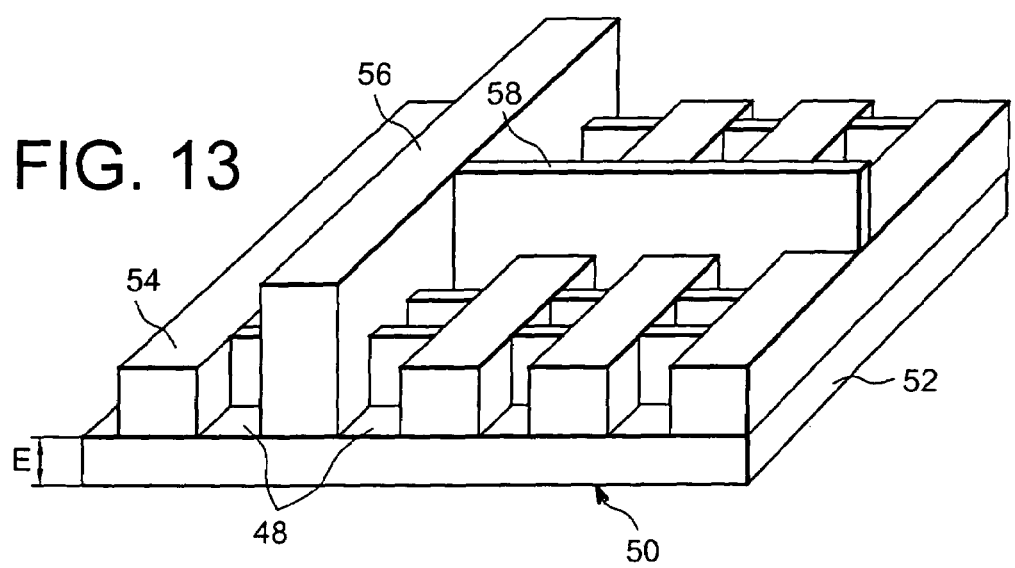
FIG. 13 is a diagrammatic and partial view of an information medium according to the invention, comprising areas that increases the stiffness of the medium, FIG. 14 diagrammatically illustrates the formation of the magnetic deposit by a beam of atoms at normal incidence, FIG. 15 diagrammatically illustrates the formation of the magnetic deposit by a beam of atoms at oblique incidence, FIG. 16 diagrammatically illustrates the formation of an information storage medium according to the invention, using a layer that is etched to form the holes, FIG. 17 diagrammatically illustrates the use of an etching mask to form an information storage medium according to the invention, FIGS. 18 and 19 diagrammatically illustrate steps in manufacturing an information storage medium according to the invention provided with an auxiliary substrate, and FIGS. 20 and 21 diagrammatically illustrate the steps in manufacturing an information storage medium according to the invention, using two substrates for this manufacturing.

Areas without dots such as areas 54, 56 and 58 in FIG. 13 could advantageously be provided in judiciously chosen regions to reinforce the mechanical stiffness of the complete medium, consequently the thickness of these areas would be equal to the total initial thickness of the substrate or a fraction of it.

The magnetic deposit is formed using a conventional thin layer deposition technique, for example cathodic sputtering, epitaxy or electrolysis. This deposit may be composed of a magnetic material such as Co, Fe or Ni. It may also be composed of several magnetic materials.

This magnetic deposit could also be formed from a single layer or a superposition of layers of magnetic materials and possibly non-magnetic materials. For example, multilayers can be used chosen from among Co/Pt, Fe/Pt and Co/Py where Py denotes permalloy.

The magnetic deposit may also be made at normal incidence or at oblique incidence, at a determined angle. Further information about this subject is given in the following document:

[5] International application WO 03/005349A, "support de stockage d'informations à réseau de plots aimantés latéralement et procédé de fabrication de ce support, invention by B. Rodmacq, S. Landis and B. Dieny.

Figure 14:
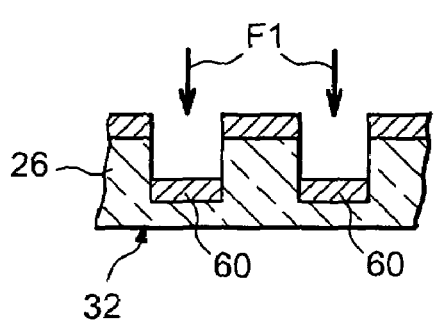

FIG. 14 diagrammatically illustrates the formation of the magnetic deposit 60 at the bottom of recesses, using a beam F1 of atoms of magnetic material(s) directed onto the medium at normal incidence.

Figure 15:
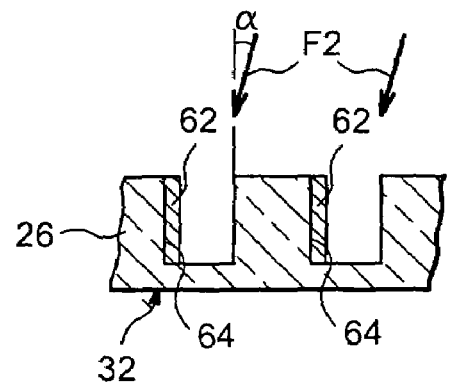

FIG. 15 diagrammatically illustrates the formation of the magnetic deposit 62 on the sidewalls 64 of the recesses, using a beam F2 of atoms of magnetic material(s) directed onto the medium at oblique incidence α.

If the angle of incidence is modified, the deposition is formed on different walls. For example, the use of a −α incidence can reach walls opposite to those that correspond to α. Thus deposits can be formed on all or part of the sidewalls, by directing atoms of magnetic material(s) at one or several successive incidences.

A deposit at normal incidence can also be combined with one or several deposits at one or several oblique incidences to obtain a deposit on the bottom of the holes and on the sidewalls.

The geometric characteristics of the medium that is formed are chosen such that magnetostatic interactions between the different regions covered with magnetic material(s) are not predominant compared with the stability of the magnetic material(s), in other words with respect to the capacity of this (these) material(s), to keep its (their) magnetisation direction as a function of the magnetic field applied to it (them), a capacity related to anisotropy properties of this or these materials so as not to disturb writing of information.

For example, considering the case in which the magnetic material(s) is (are) deposited in the bottom of the holes and on parts in relief (case shown in FIG. 4), the value of the parameter h1 seen in FIG. 4 can be chosen to be greater than the thickness of the deposit formed. As the value of h1 increases compared with the thickness of the magnetic layer formed, the magnetostatic interactions between these regions will become lower compared with the capacity of this layer to maintain its magnetisation direction, in other words its anisotropy energy.

Concerning interactions between the bottoms of adjacent holes, for a constant period, the dimensions of the holes can be reduced and the spacing between the holes can be increased.

In order to use the medium formed, the read/write head (conventional read/write head used in existing hard disks, or near field tips or matrix of tips, or a lens in the case of a magneto-optical recording) will be placed facing the approximately plane front face of the medium as has already been mentioned.

We will also give other few examples of the invention below.

Note firstly that the medium may be made of silicon, glass, aluminium or a hardened polymer:

Furthermore, the holes array may be etched directly in the back face of a substrate, for example made of a material chosen from among the previous materials.

As a variant, a layer 66 (FIG. 16) is formed on a layer 67 made of a material different from the material used for layer 66 and the holes 68 are formed through the layer 66 such that the bottom of the holes is formed by the layer 67.

The thickness of the layer 66 is between a few nanometers and a few micrometers.

Furthermore, the materials from which layers 66 and 67 are made can be chosen so as to have high etching selectivity. For example silicon can be chosen for the layer 67 and silicon oxide can be chosen for layer 66, so that layer 66 can be wet etched using hydrofluoric acid.

Furthermore, the material in layer 67 can advantageously be chosen such that it reinforces the mechanical properties of the assembly obtained. For example, a layer 66 made of silicon and a layer 67 made of tungsten can be used.

Figure 17:
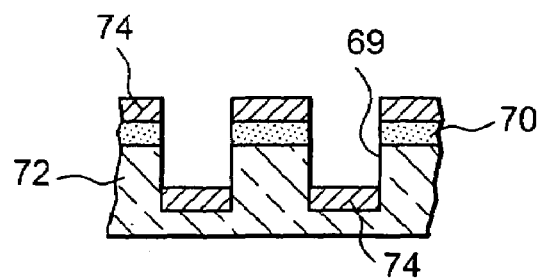

Furthermore, the holes 69 (FIG. 17) are preferably formed through an etching mask 70 previously formed on the back face of a substrate 72, this mask being made from a photosensitive resin (photoresist) or being a hard mask, and the magnetic deposit 74 is formed before this mask is eliminated so as to eliminate this deposit from parts in relief (when the mask is eliminated).

Consequently, this eliminates the problem of magnetostatic interactions between the bottom of the holes and the parts in relief.

Figure 18:
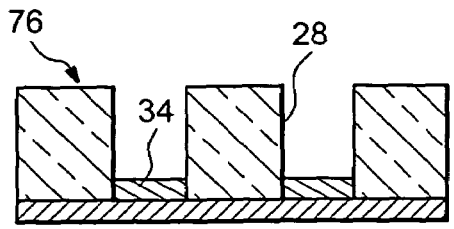
Figure 19:
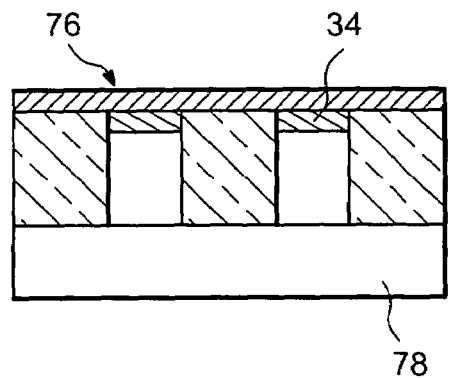

Furthermore, the medium 76 (FIG. 18) obtained according to the invention (and therefore comprising holes 28 provided with magnetic deposits 34) may be transferred, for example by bonding, onto another substrate 78 (FIG. 19) that is advantageously flat, for example to reinforce the mechanical strength of the medium 76. It can be seen that the substrate 78 is fixed to the back face of the substrate 76.

Figure 16:
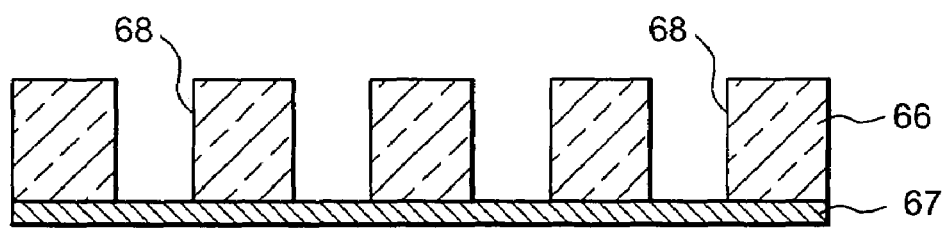
Figure 20:
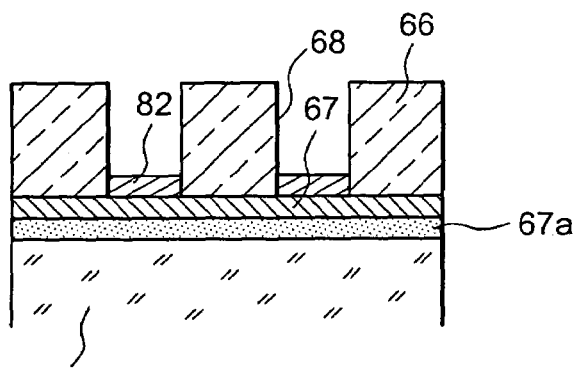

Furthermore, according to one manufacturing variant diagrammatically illustrated in FIG. 20, a first layer 67a is formed on a substrate 80. The layer 67 is then formed as shown in FIG. 16 on layer 67a and layer 66 is then formed on layer 67. The next step is to form the holes 68 through the layer 66, the bottom of the holes thus being formed by the layer 67. The next step is to form the magnetic deposit 82 at the bottom of the holes. The layer 67 is then separated from the substrate 80, for example using a wet etching technique.

For example, silicon (Si) will advantageously be chosen for the material of substrate 80 and the layer 67 and silicon oxide (SiO$_2$) will be chosen for the material of layer 67a. Wet etching with hydrofluoric (HF) acid can selectively eliminate SiO$_2$ with respect to Si.

Figure 21:
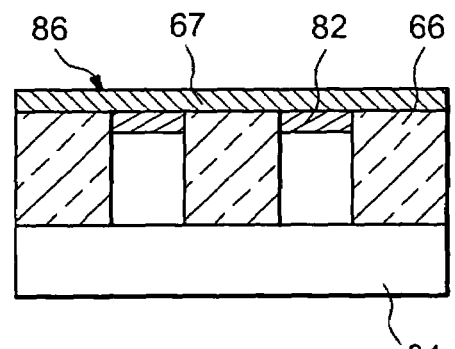

An auxiliary layer 84 called the fourth layer (FIG. 21) is then fixed on the back face of the layer 66 from which the holes were formed, and the holes are thus closed off by this layer 84.

The front face of the medium thus obtained according to the invention is the face 86 of the layer 67, opposite the face of this layer 67 on the same side as the holes.

The invention claimed is:

1. A method for manufacturing an information storage medium, comprising:
    providing a medium having an approximately plane front face and an approximately plane opposite back face, wherein the medium is configured to be read and/or written by a read and/or write device placed facing the front face;
    predetermining a distance separating the front face from a magnetic deposit being such that the read and/or write device can read and write the information in the magnetic deposit;
    providing recessed areas in the back face having the predetermined distance between the front face and the bottom of the recessed areas; and
    providing the magnetic deposit used for information storage within the recessed areas, thereby forming a discrete information storage array on the back face wherein each recessed area is configured to contain at least one magnetic domain representing an elementary bit defined by a magnetization direction.

2. The method according to claim 1, further comprising:
    providing on the back face areas configured to make the medium stiff.

3. The method according to claim 1, further comprising:
    forming the magnetic deposit in the bottom of the recessed areas using a beam of atoms of at least one magnetic material directed onto the back face of the medium, the beam substantially perpendicular to the back face.

4. The method according to claim 1, further comprising:
    forming the magnetic deposit on all or part of the sidewalls of the recessed areas using a beam of atoms of at least one magnetic material directed onto the back face of the medium, the beam oblique to the back face.

5. The method according to claim 1, further comprising:
    providing the front face on a first layer of the medium;
    providing the back face on a substrate layer attached to the first layer; and
    forming the recessed areas directly in the substrate layer.

6. The method according to claim 5, further comprising:
    forming the recessed areas through the substrate layer such that the first layer forms the bottom of the recessed areas.

7. The method according to claim 1, further comprising:
    forming an etching mask on the back face;
    forming the recessed areas by etching through the etching mask;
    providing the magnetic deposit to the back face including the etching mask; and
    removing the etching mask and the magnetic deposit formed on the etching mask.

8. The method according to claim 1, further comprising:
    affixing an auxiliary substrate to the back face of the medium.

9. The method according to claim 1, further comprising:
    forming a first layer of the medium on a first substrate;
    forming a second layer of the medium on the first layer;
    forming a third layer of the medium on the second layer;
    forming the recessed areas through the third layer such that the second layer forms the bottom of the recessed areas;
    forming the magnetic deposit in the recessed areas of the third layer on the second layer; and
    affixing a second substrate to the third layer.

* * * * *